(12) United States Patent
Clum et al.

(10) Patent No.: US 10,830,049 B2
(45) Date of Patent: Nov. 10, 2020

(54) LEADING EDGE HYBRID CAVITIES AND CORES FOR AIRFOILS OF GAS TURBINE ENGINE

(71) Applicant: United Technologies Corporation, Farmington, CT (US)

(72) Inventors: Carey Clum, East Hartford, CT (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 269 days.

(21) Appl. No.: 15/584,119

(22) Filed: May 2, 2017

(65) Prior Publication Data

US 2018/0320525 A1 Nov. 8, 2018

(51) Int. Cl.

| | |
|---|---|
| *F01D 5/14* | (2006.01) |
| *F01D 5/18* | (2006.01) |
| *B22C 9/10* | (2006.01) |
| *F01D 5/20* | (2006.01) |
| *B22C 13/10* | (2006.01) |

(52) U.S. Cl.
CPC .............. *F01D 5/141* (2013.01); *B22C 9/103* (2013.01); *B22C 13/10* (2013.01); *F01D 5/147* (2013.01); *F01D 5/187* (2013.01); *F01D 5/20* (2013.01); *F01D 5/18* (2013.01); *F05D 2240/24* (2013.01); *F05D 2240/301* (2013.01); *F05D 2240/303* (2013.01); *F05D 2240/304* (2013.01); *F05D 2240/307* (2013.01); *F05D 2250/231* (2013.01); *F05D 2250/60* (2013.01); *F05D 2250/711* (2013.01); *F05D 2260/201* (2013.01);

(Continued)

(58) Field of Classification Search
CPC . F01D 5/18; F01D 5/147; F01D 5/187; F01D 5/141; F01D 5/20; F05D 2240/303; F05D 2260/301; F05D 2260/201; F05D 2250/711; B22C 9/103; B22C 13/10
See application file for complete search history.

(56) References Cited

U.S. PATENT DOCUMENTS

| | | | |
|---|---|---|---|
| 5,536,143 A | 7/1996 | Jacala et al. | |
| 7,520,725 B1 * | 4/2009 | Liang | ...................... F01D 5/186 416/97 R |

(Continued)

OTHER PUBLICATIONS

European Search Report, European Application No. 18159671.9, dated Nov. 12, 2018, European Patent Office; EP Search Report 12 pages.

(Continued)

*Primary Examiner* — David E Sosnowski
*Assistant Examiner* — Danielle M. Christensen
(74) *Attorney, Agent, or Firm* — Cantor Colburn LLP

(57) ABSTRACT

Airfoils having a leading edge, a trailing edge, a first end, and a second end with a leading edge hybrid skin core cavity formed within the airfoil extending from the first end to the second end proximate the leading edge, the cavity having a hot wall and a cold wall. The cavity has a variable height-to-width ratio in a direction from the first end to the second end, with a first aspect ratio proximate the first end and a second aspect ratio proximate the second end with the height defined as a maximum distance between the hot wall and the cold wall and the width is defined as an arc length of the cold wall.

14 Claims, 7 Drawing Sheets

(52) U.S. Cl.
CPC .. *F05D 2260/202* (2013.01); *F05D 2260/205* (2013.01); *F05D 2300/20* (2013.01)

(56) References Cited

U.S. PATENT DOCUMENTS

| | | | | |
|---|---|---|---|---|
| 8,052,389 | B2* | 11/2011 | Kopmels | F01D 5/147 |
| | | | | 416/233 |
| 8,197,211 | B1* | 6/2012 | Liang | F01D 5/282 |
| | | | | 416/224 |
| 8,414,263 | B1* | 4/2013 | Liang | F01D 5/186 |
| | | | | 416/96 R |
| 8,545,169 | B2* | 10/2013 | Ahmad | F01D 5/187 |
| | | | | 415/115 |
| 8,936,067 | B2* | 1/2015 | Lee | B22C 9/10 |
| | | | | 164/369 |
| 9,022,736 | B2* | 5/2015 | Lee | F01D 5/186 |
| | | | | 416/97 R |
| 9,556,742 | B2 | 1/2017 | Parkin et al. | |
| 10,022,790 | B2* | 7/2018 | Lee | B22C 7/02 |
| 10,316,668 | B2* | 6/2019 | Blake | F01D 5/181 |
| 2009/0047136 | A1 | 2/2009 | Chon et al. | |
| 2010/0143153 | A1 | 6/2010 | Gross | |
| 2015/0040582 | A1* | 2/2015 | Dong | F01D 5/187 |
| | | | | 60/806 |
| 2015/0159501 | A1 | 6/2015 | Firnhaber | |
| 2015/0292334 | A1* | 10/2015 | Mongillo, Jr. | F01D 5/20 |
| | | | | 416/97 R |
| 2015/0377029 | A1* | 12/2015 | Blake | F01D 5/187 |
| | | | | 416/232 |
| 2017/0002662 | A1 | 1/2017 | Waite et al. | |
| 2018/0051574 | A1* | 2/2018 | Weber | F02C 3/04 |

OTHER PUBLICATIONS

European Office Action, European Application No. 18159671.9, dated Aug. 21, 2020, European Patent Office, 5 pages.

* cited by examiner

LEADING EDGE HYBRID CAVITIES AND CORES FOR AIRFOILS OF GAS TURBINE ENGINE

STATEMENT REGARDING FEDERALLY SPONSORED RESEARCH OR DEVELOPMENT

This invention was made with government support under Contract No. DTFAWA-15-A-80010 awarded by the U.S. Federal Aviation Administration. The government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Flow across the airfoil tip may affect gas turbine engine performance. Clearance, abrasion and temperature effects are of concern proximate the second end of the airfoil.

BRIEF DESCRIPTION

According to some embodiments, airfoils for gas turbine engines are provided. The airfoils include an airfoil body having a leading edge, a trailing edge, a first end, and a second end, wherein a direction from the first end to the second end is a radial direction and a direction from the leading edge to the trailing edge is an axial direction and a leading edge hybrid skin core cavity formed within the airfoil body and defining a cooling flow path extending from the first end to the second end of the airfoil proximate the leading edge of the airfoil, the leading edge hybrid skin core cavity having a hot wall and a cold wall, the hot wall being a cavity wall that is part of an external wall of the leading edge of the airfoil body and the cold wall is an internal wall or surface of the airfoil body that is not adjacent or part of an external wall of the airfoil body. The leading edge hybrid skin core cavity has a variable height-to-width ratio in a direction from the first end to the second end, with a first aspect ratio proximate the first end and a second aspect ratio proximate the second end, wherein the first aspect ratio is different from the second aspect ratio, and the height is defined as a maximum distance between the hot wall and the cold wall and the width is defined as an arc length of the cold wall.

In addition to one or more of the features described herein, or as an alternative, further embodiments of the airfoils may include that the first aspect ratio is a low aspect ratio and the second aspect ratio is a high aspect ratio.

In addition to one or more of the features described herein, or as an alternative, further embodiments of the airfoils may include that the low aspect ratio is less than 0.5 and the high aspect ratio is greater than 0.6.

In addition to one or more of the features described herein, or as an alternative, further embodiments of the airfoils may include a radial flow cavity located within the airfoil body axially behind the leading edge hybrid skin core cavity relative to the leading edge of the airfoil body.

In addition to one or more of the features described herein, or as an alternative, further embodiments of the airfoils may include that the cold wall is located between the radial flow cavity and the leading edge hybrid skin core cavity.

In addition to one or more of the features described herein, or as an alternative, further embodiments of the airfoils may include at least one impingement hole formed in the cold wall and fluidly connecting the radial flow cavity and the leading edge hybrid skin core cavity.

In addition to one or more of the features described herein, or as an alternative, further embodiments of the airfoils may include that the hot wall has a hot wall geometric profile that mimics an external leading edge profile of the leading edge of the airfoil.

In addition to one or more of the features described herein, or as an alternative, further embodiments of the airfoils may include that the hot wall has a first hot wall geometric profile proximate the second end and a second hot wall geometric profile proximate the first end, wherein the first hot wall geometric profile is different from the second hot wall geometric profile.

In addition to one or more of the features described herein, or as an alternative, further embodiments of the airfoils may include that the cold wall has a first cold wall geometric profile proximate the second end and a second cold wall geometric profile proximate the first end, wherein the first cold wall geometric profile is different from the second cold wall geometric profile.

In addition to one or more of the features described herein, or as an alternative, further embodiments of the airfoils may include at least one internal convective heat transfer augmentation feature within the leading edge hybrid skin core cavity.

In addition to one or more of the features described herein, or as an alternative, further embodiments of the airfoils may include that the internal convective heat transfer augmentation feature is at least one of trip strips, turbulators, pin fins, or pedestals.

In addition to one or more of the features described herein, or as an alternative, further embodiments of the airfoils may include that the first end is a root of the airfoil and the second end is a tip of the airfoil.

According to some embodiments, leading edge hybrid cores for manufacturing airfoils of gas turbine engines are provided. The leading edge hybrid cores include a core body that extends from a core first end to a core second end, the core body having a hot wall geometric profile extending from the core first end to the core second end and a cold wall geometric profile extending from the core first end to the core second end. The core body has a variable height-to-width ratio in a direction from the core first end to the core second end, with a first aspect ratio proximate the core first end and a second aspect ratio proximate the core second end wherein the first aspect ratio is different from the second aspect ratio, and the height is defined as maximum distance between the hot wall geometric profile and the cold wall geometric profile and the width is defined as an arc length of the cold wall geometric profile.

In addition to one or more of the features described herein, or as an alternative, further embodiments of the leading edge hybrid cores may include that the first aspect ratio is a low aspect ratio and the second aspect ratio is a high aspect ratio.

In addition to one or more of the features described herein, or as an alternative, further embodiments of the leading edge hybrid cores may include that the low aspect ratio is less than 0.5 and the high aspect ratio is greater than 0.6.

In addition to one or more of the features described herein, or as an alternative, further embodiments of the leading edge hybrid cores may include that the hot wall geometric profile is arranged to mimic an external leading edge profile of a leading edge of an airfoil to be formed by the leading edge hybrid core.

In addition to one or more of the features described herein, or as an alternative, further embodiments of the leading edge hybrid cores may include that the hot wall geometric profile transitions from a first hot wall geometric profile proximate the core second end to a second hot wall geometric profile proximate the core first end, wherein the first hot wall geometric profile is different from the second hot wall geometric profile.

In addition to one or more of the features described herein, or as an alternative, further embodiments of the leading edge hybrid cores may include that the cold wall geometric profile transitions from a first cold wall geometric profile proximate the core second end to a second cold wall geometric profile proximate the core first end, wherein the first cold wall geometric profile is different from the second cold wall geometric profile.

In addition to one or more of the features described herein, or as an alternative, further embodiments of the leading edge hybrid cores may include at least one structure to form an internal convective heat transfer augmentation feature within a leading edge hybrid skin core cavity formed by the leading edge hybrid core.

In addition to one or more of the features described herein, or as an alternative, further embodiments of the leading edge hybrid cores may include that the internal convective heat transfer augmentation feature is at least one of trip strips, turbulators, pin fins, or pedestals.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
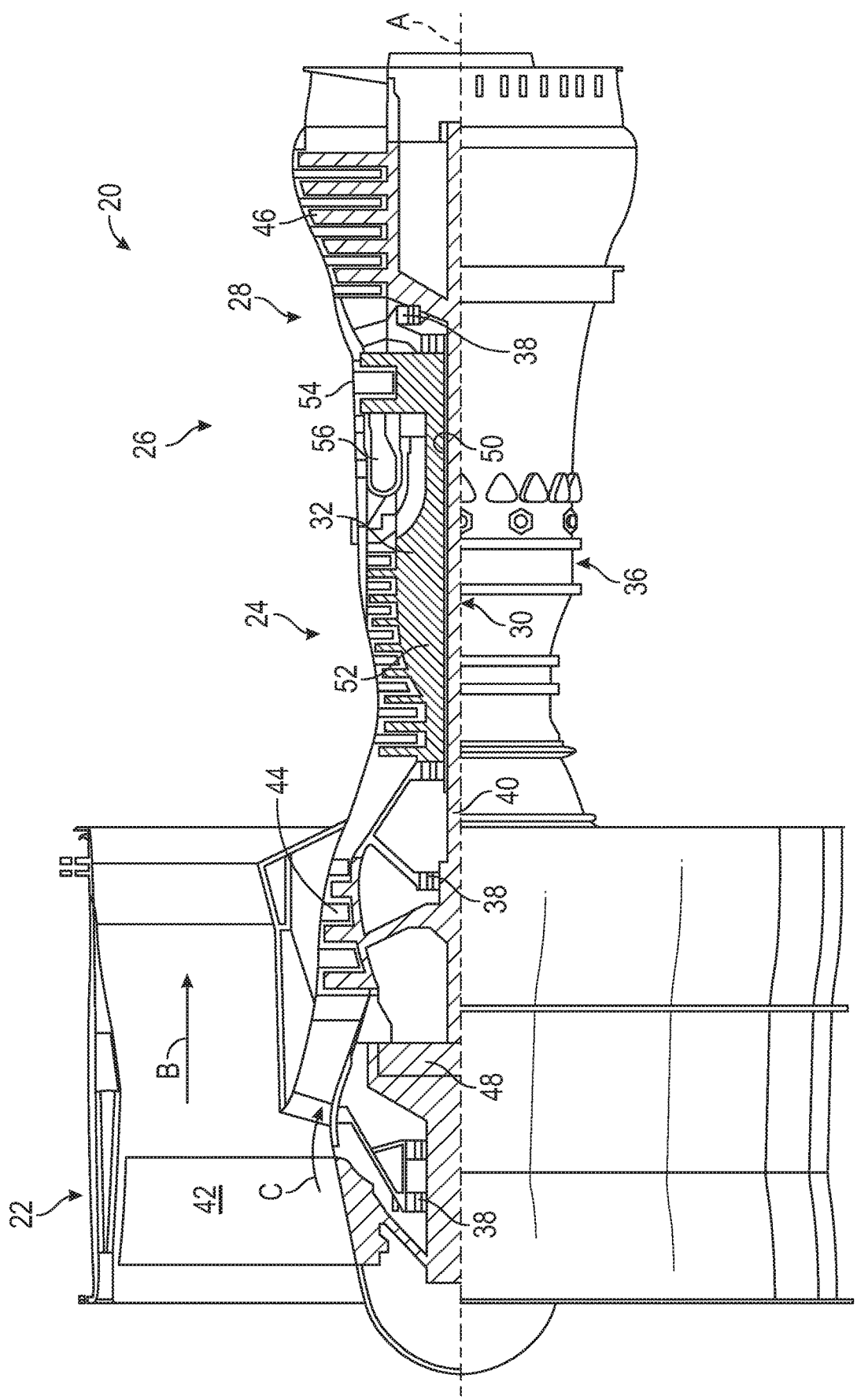
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
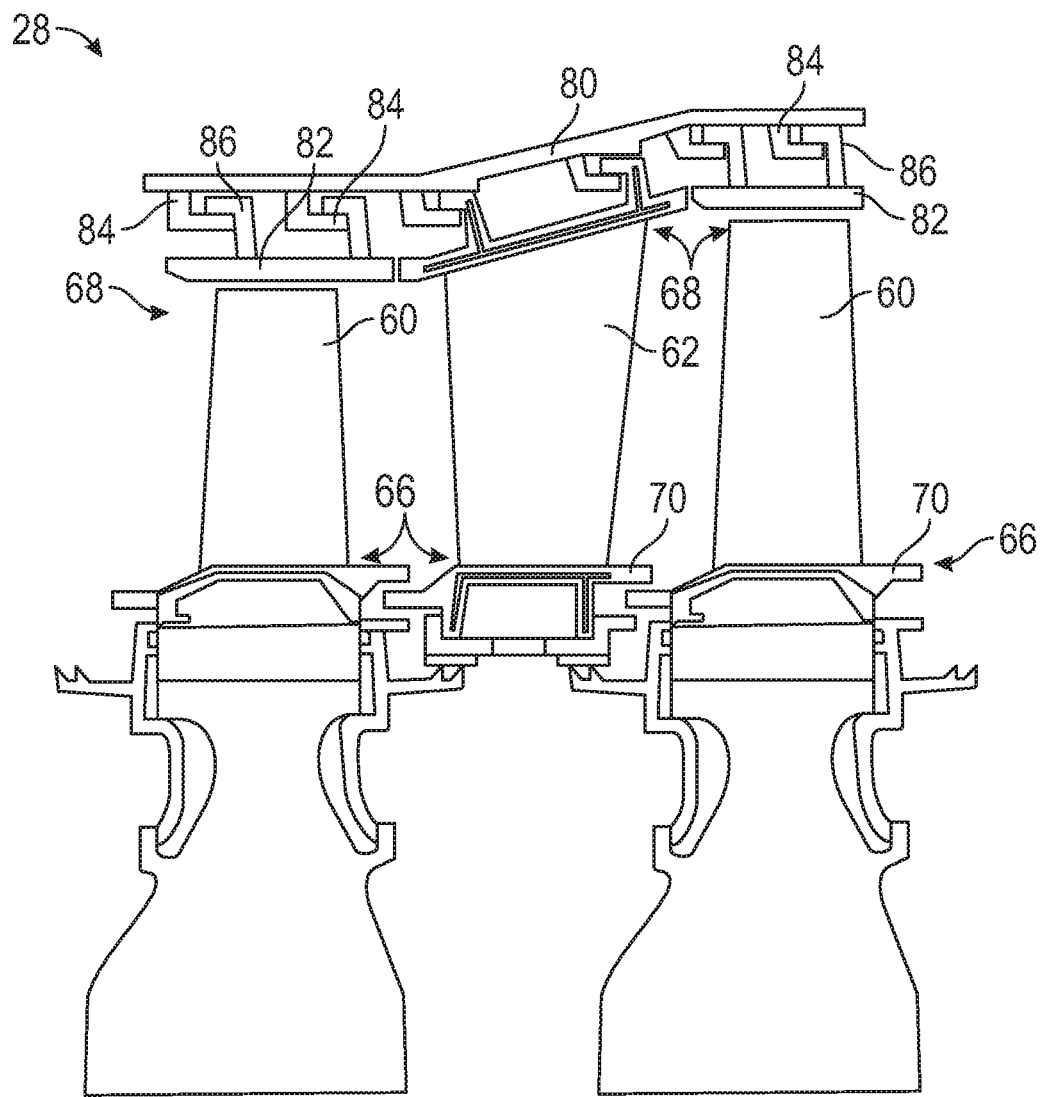
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connected to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the airfoil 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
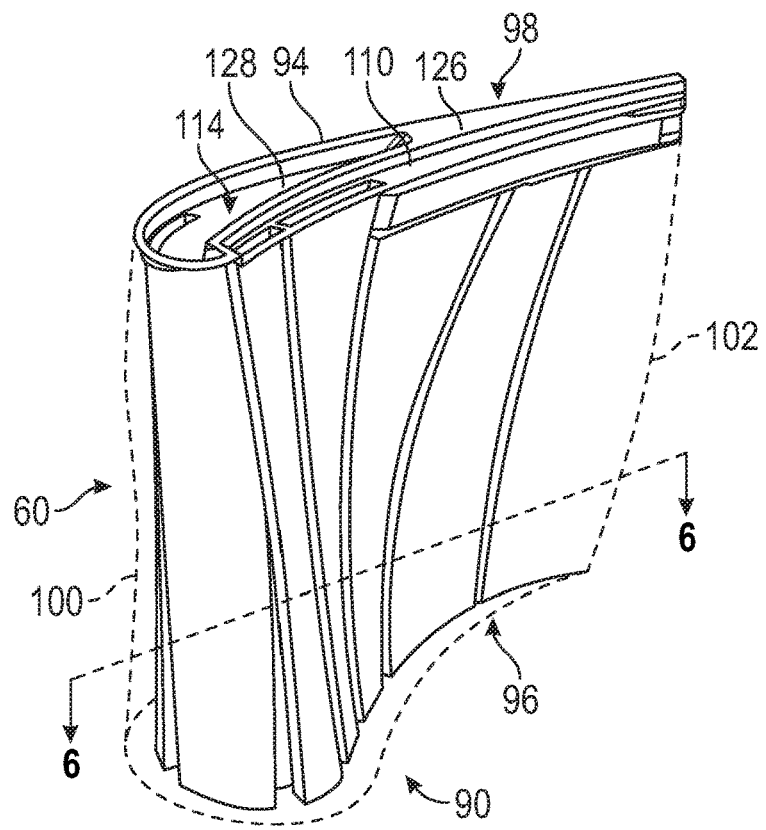
FIG. 3 is a perspective view of an airfoil.
Figure 4:
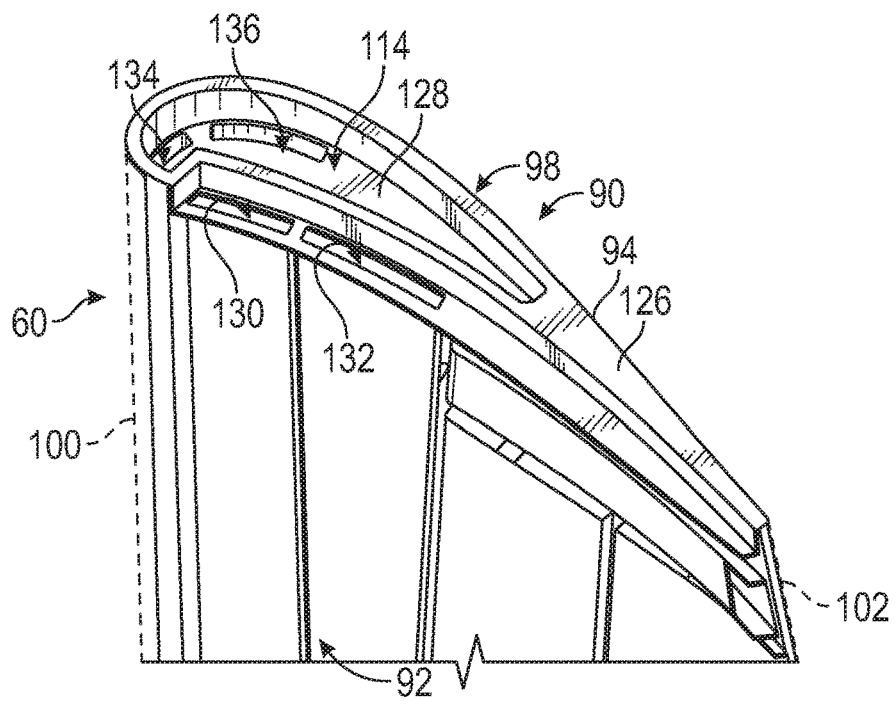
FIG. 4 is a partial perspective view of the airfoil.

As shown in FIGS. 3 and 4, the airfoil 60 includes an airfoil body 90 having a pressure side 92, a suction side 94, a first end 96, a second end 98, a leading edge 100, and a trailing edge 102. As schematically shown, the airfoil 60 is a blade wherein the first end 96 is a root of the airfoil 60 and the second end 98 is a tip of the airfoil 60. Those of skill in the art will appreciate that although a blade is shown as the example airfoil, embodiments described herein can be applied to any airfoil, including vanes, without departing from the scope of the present disclosure.

The pressure side 92 of the airfoil body 90 is disposed opposite the suction side 94. The pressure side 92 and the suction side 94 each extend radially from the first end 96 to the second end 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to an engine axis) between the leading edge 100 and the trailing edge 102. Each of the first end 96 and the second end 98 extend from the leading edge 100 to the trailing edge 102 opposite each other at ends of the airfoil body 90 in the radial direction. That is, the first end 96 defines an inner radial end of the airfoil body 90 and the second end defines an outer radial end of the airfoil body 90 (relative to an engine axis).

The airfoil body 90, as shown, includes a tip shelf 110 and an airfoil-tip squealer pocket 114 formed within the second end 98 of the airfoil body 90. The airfoil-tip squealer pocket 114 and/or tip shelf 110 may be provided with a plurality of cooling holes as will be appreciated by those of skill in the art. A tip surface 126 is formed between the airfoil-tip squealer pocket 114 and the tip shelf 110 and separates the two features. The airfoil-tip squealer pocket 114 is at least partially defined by a portion or wall of the suction side 94, a portion or wall of the leading edge 100, a wall that defines a portion of the tip surfaces, and a squealer pocket surface 128 that extends between the radially extending portions or walls. As shown, the squealer pocket surface 128 is spaced radially inward and apart from the tip surface 126. Thus, the squealer pocket surface 128 is substantially parallel to, but not coplanar with, the tip surface 126.

Accordingly, the airfoil-tip squealer pocket 114 is radially recessed within the second end 98 of the airfoil body 90. The airfoil-tip squealer pocket 114 is at least partially disposed between the suction side 94 and the tip shelf 110. As noted, the airfoil-tip squealer pocket 114 may be provided with a plurality of cooling holes that extend at least partially through the airfoil-tip squealer pocket 114 into an interior of the airfoil body 90. The airfoil-tip squealer pocket 114 can significantly reduce the amount of thermal mass present proximate the second end 98. The removal of the thermal mass due to the incorporation of the airfoil-tip squealer pocket 114 can more closely match transient thermal responses of the second end 98.

Referring still to FIGS. 3-6, the airfoil body 90 defines or includes a plurality of interior cavities to enable cooling of the airfoil 60. For example, as shown, the airfoil 60 includes a first pressure side hybrid skin core cavity 130, a second pressure side hybrid skin core cavity 132, a leading edge hybrid skin core cavity 134, a suction side hybrid skin core cavity 136, a forward radial flow cavity 138, various serpentine flow cavities 140, 142, 144, and a trailing edge slot 146. The airfoil body 90 may include additional and/or alternative cavities, flow paths, channels, etc. as will be appreciated by those of skill in the art, including, but not limited to, tip cavities, serpentine cavities, trailing edge cavities, etc.

Figure 5:
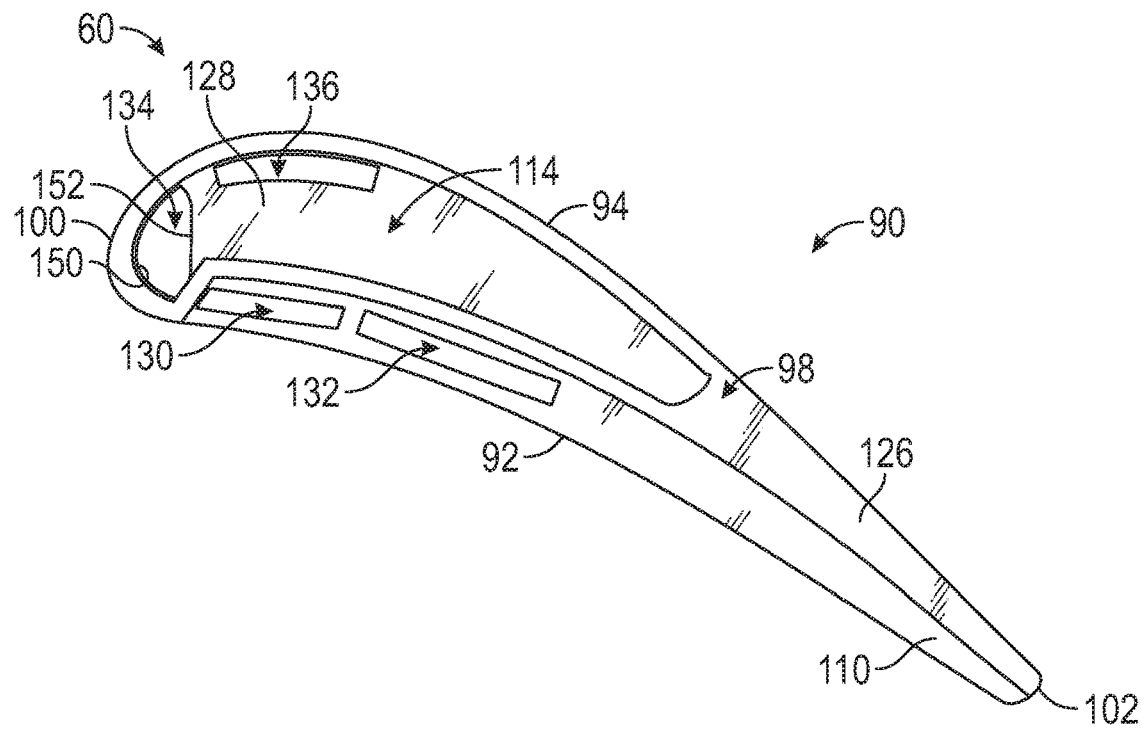
FIG. 5 is a top view of the airfoil.
Figure 6:
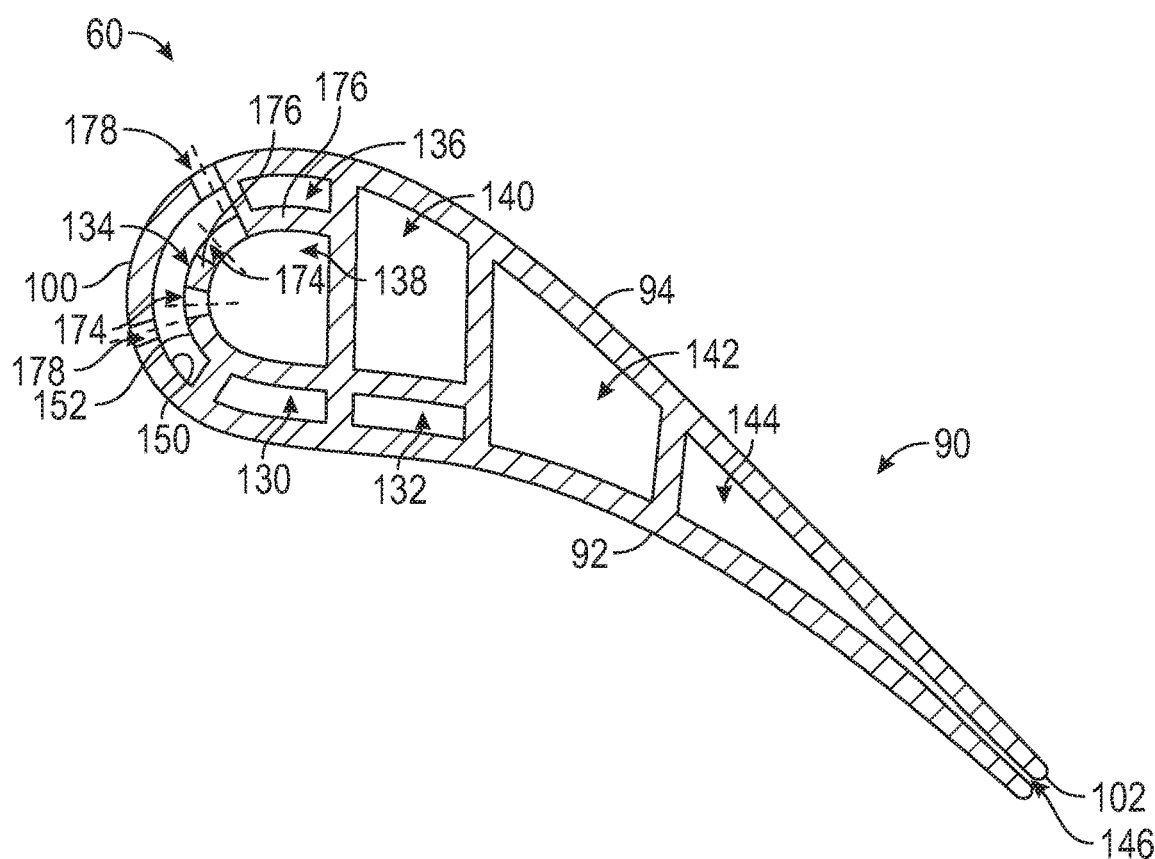
FIG. 6 is a partial cross-sectional view of the airfoil as viewed along the line 6-6 shown in FIG. 3.

As used herein, the term "skin" refers to an external hot surface or wall of the airfoil (e.g., external walls that define or form the leading edge 100, the pressure side 92, and the suction side 94). The external hot surface of a wall of the airfoil may be arranged close to or proximate an external heat source when installed within a gas turbine engine, e.g., within a hot gas path. For example, as shown in FIGS. 5-6, the leading edge hybrid skin core cavity 134 has a hot wall 150 and a cold wall 152. The hot wall 150 of the leading edge hybrid skin core cavity 134 is a cavity wall that is part of an external wall of the leading edge of the airfoil 90. The cold wall 152 is an internal wall or surface of the airfoil 90 that is not adjacent or part of a wall that is exposed to hot, gas path air.

In this sense, the hybrid skin core cavities can provide localized convective cooling immediately adjacent to the local hot wall surface where the hybrid skin core cavity is positioned. Typically only one airfoil external surface (e.g., the pressure side 92, the suction side 94, or the leading edge 100) is influenced by the local convective cooling provided by respective/associated hybrid skin core cavity. In contrast, conventional cooling cavity channels typically span across the airfoil from the pressure side to the suction side (e.g., as shown in FIG. 6, serpentine cavity 142) and provide active convective cooling to both the pressure side and the suction side airfoil surfaces concurrently.

As used herein, the term "hybrid" in the context of the present disclosure refers to cavities that can contain internal heat transfer augmentation features near or immediately adjacent to a hot wall surface. The term "hybrid" also refers to providing cooling in local proximity to where the internal heat transfer augmentation features are located. Heat transfer augmentation features include, but are not limited to, trip strips, turbulators, pedestals, pin fins, or the like.

The hybrid skin core cavities in accordance with embodiments of the present disclosure have low aspect ratios and/or variable aspect ratios as variable along a span from the inner diameter to the outer diameter (e.g., root to tip). In some embodiments, a hybrid skin core cavity, or portion thereof, may have a height-to-width ratio of less than about 0.8, while conventional height-to-width ratios may be greater than about 0.8. In some embodiments, the leading edge hybrid skin core cavity 134 can have a height-to-width ratio of 0.8 or less along at least a portion of a radial length of the leading edge hybrid skin core cavity 134. As used with respect to the described cavity height-to-width ratio, a "height" of a cavity is a distance from a surface on an outer wall of the airfoil that partially defines the cavity to a surface of an inner wall that is internal to the airfoil (e.g., distance between hot wall 150 and cold wall 152 that partially define the leading edge hybrid skin core cavity 134). Further, a width of a cavity, as used herein, is an arc length of the cold wall.

The hybrid skin core cavities of the present disclosure are cooling passages or cooling cavities that are disposed immediately adjacent to a hot wall. The hybrid skin core cavities are the resultant hollow cooling passages or cavities that may be fabricated using conventional silica and/or alumina ceramic matrix core materials, and/or made from a refractory metal core ("RMC") molybdenum based core material used during an airfoil core manufacturing process. During the investment casting process the silica and/or alumina ceramic cores or RMC material is leached out of a metal casting airfoil geometry leaving a hollow void or cooling cavity passage that may contain internal heat transfer augmentation features such as trip strips, turbulators, pedestals, pin fins, or the like. The resulting hybrid skin core cavity is located immediately adjacent to and is in close proximity to provide cooling to an external hot wall or surface of the airfoil 90. The hybrid skin core cavities of the present disclosure provide local cooling to a single hot wall of the airfoil body 90. As such, a hybrid skin core cavity is disposed between or adjacent to a hot wall and a cold wall.

The low aspect ratio and sizing of the hybrid skin core cavities makes the cooling cavity geometry less susceptible to the adverse internal flow structures that can result from internal Coriolis effects attributed to blade centrifugal rotation. In this sense, the hybrid skin core cavity passage vortices are small and therefore the enhancement of internal convective heat transfer attributed to the counter rotating vortices typically observed in larger cooling cavities is not present. In this sense the hybrid skin core cavity geometry is not able to leverage the additional augmentation typically observed in conventional cooling cavities. However due to having small cross-sectional area, the hybrid skin core cavity geometry is conducive to generating high internal convective heat transfer coefficients due to the high flow per unit area that can be achieved with these cooling channel sizes.

The hybrid skin core cavities of the present disclosure can be formed by a hybrid skin core. A hybrid skin core refers to the physical core structure that exists after core die injection. The hybrid skin core is used to create internal features of a final part or component (e.g., airfoil) and represents a negative of the final part (or portion thereof). The hybrid skin core typically is made of a silica ceramic or alumina ceramic matrix material. It can also be made from refractory metal core material, such as molybdenum-based core material. The hybrid skin core material is typically injected as a slurry and then fired to create a solid ceramic core body that is subsequently placed in a wax mold. The wax mold is then injected with material to create the final component structure.

As noted, hybrid skin core cavities can have better internal heat transfer characteristics, as compared to conventional cavities, partly due to the aspect ratio of the channel. However, the hybrid skin core that forms the hybrid skin core cavity and/or the airfoil structure about the hybrid skin cavity can only withstand so much curvature. For example, if the radius of curvature of the hybrid skin core becomes too small, core breakage can become a concern. However, having small radii of curvature may be beneficial at certain locations of an airfoil. For example, a small radius of curvature can be found on the leading edge 100 of most airfoils, particularly near the second end 98 of the airfoil 90, thus making it difficult to employ a skin core along the leading edge 100 of the airfoil 90 during manufacture, to form the leading edge hybrid skin core cavity 134.

The leading edge hybrid skin core cavity 134 extends from the first end 96 toward the second end 98 of the airfoil body 90. The leading edge hybrid skin core cavity 134 is located proximate the leading edge 100 of the airfoil body 90. The leading edge hybrid skin core cavity 134 is axially and circumferentially spaced apart from the first pressure side hybrid skin core cavity 130 and the suction side hybrid skin core cavity 136, as shown in FIG. 6. The leading edge hybrid skin core cavity 134 has a hot wall 150 that extends along the leading edge 100 and a cold wall 152 that extends along a defining wall of the forward radial flow cavity 138.

In some embodiments, as shown in FIGS. 5-6, the leading edge hybrid skin core cavity 134 has an arcuate shape, contour, and/or geometry that follows or matches the local shape, contour, and/or curvature of the local external leading edge aerodynamic geometry of the surface of the leading edge 100. In other embodiments, the leading edge hybrid skin core cavity 134 may be formed having a shape, contour, and/or geometry that is different from the shape, contour, and/or geometry of the leading edge 100.

FIGS. 5-6 illustrate the transition of the leading edge hybrid skin core cavity geometry shape at the first end 96 (as shown in FIG. 6) and the second end (as shown in FIG. 5). In this instance, the leading edge core geometry shape is configured to better match the local external heatload and internal convective boundary conditions in order to provide a more optimal distribution of thermal cooling effectiveness radially along the leading edge 100 of the airfoil surface.

With reference again to FIGS. 3-4, the leading edge hybrid skin core cavity 134 receives cooling air from a leading edge inlet cavity located proximate the first end 96 and the cooling air flows radially outward toward the second end 98. The leading edge hybrid skin core cavity 134 is configured to provide cooling flow to and within airfoil-tip squealer pocket 114. Cooling air may be supplied from the first end 96 (e.g., from the leading edge inlet cavity), flow in a radial direction through the leading edge hybrid skin core cavity 134, and out at the second end 98, and particularly within a leading edge portion of the airfoil-tip squealer pocket 114. The leading edge hybrid skin core cavity 134 opens from the interior of the airfoil body 90 and cooling air is discharged into the recessed portion of the airfoil-tip squealer pocket 114, as shown in FIGS. 4-5.

In operation, film cooling air will exit through the slot of the leading edge hybrid skin core cavity 134 at the airfoil-tip squealer pocket 114 and attach (or flow across) the squealer pocket surface 128. The location of the slot exit of the leading edge hybrid skin core cavity 134 is arranged to ensure that the film cooling air is radially ejected along the forward wall of the leading edge 100 and then on or over the squealer pocket surface 128.

Referring to FIG. 6, backside impingement cooling hole features 174 may be incorporated between the forward radial flow cavity 138 and the leading edge hybrid skin core cavity 134 at various locations along the length of the leading edge hybrid skin core cavity 134. For example, as shown in FIG. 6, forward radial flow cavity 138 is fluidly connected to the leading edge hybrid skin core cavity 134 by one or more impingement holes 174. Accordingly, in some embodiments, a significant increase in the convective heat transfer coefficient can be achieved within the leading edge hybrid skin core cavity 134. The low aspect ratio geometry of the leading edge hybrid skin core cavity 134 can significantly reduce the impingement distance and places the impingement jets emanating from the forward radial flow cavity 138 in close proximity to the hot wall 150. The quantity, size, and shape of the impingement holes can include, but is not limited to, circular, elliptical, oblong, tear drop, or any multifaceted geometric design configurations. Additionally the impingement holes 174 may be of a singular row that extends from the root to the tip. Further, in some embodiments, various individual impingement holes 174 can be aligned and/or offset relative to other impingement holes 174. In some configurations the leading edge impingement array may constitute of at least one singular row, or multiple rows distributed circumferentially along an internal partition wall 176 that defines the cold wall 152. The impingement holes 174 may be aligned, staggered, and/or of varying radial and circumferential pitch distributions, size, and shape dependent on geometric, heat load, cooling flow, and leading edge thermal cooling effectiveness and durability metal temperature life requirements.

Further, in some embodiments showerhead film cooling holes 187 may be incorporated along the exterior surface at the leading edge 100. Additional internal convective heat transfer augmentation at the inlet of the showerhead film cooling holes along the leading edge 100 can result in increased vorticity and turbulent mixing of the coolant flow produced by upstream impingement cooling jets (e.g., impingement holes 174). The net effect associated with the augmentation of the internal backside impingement heat transfer and the enhancement of convective heat transfer at the inlet of the leading edge film cooling holes further increases the thermal cooling effectiveness and durability capability along the leading edge 100 within the leading edge hybrid skin core cavity 134.

Figure 7A:
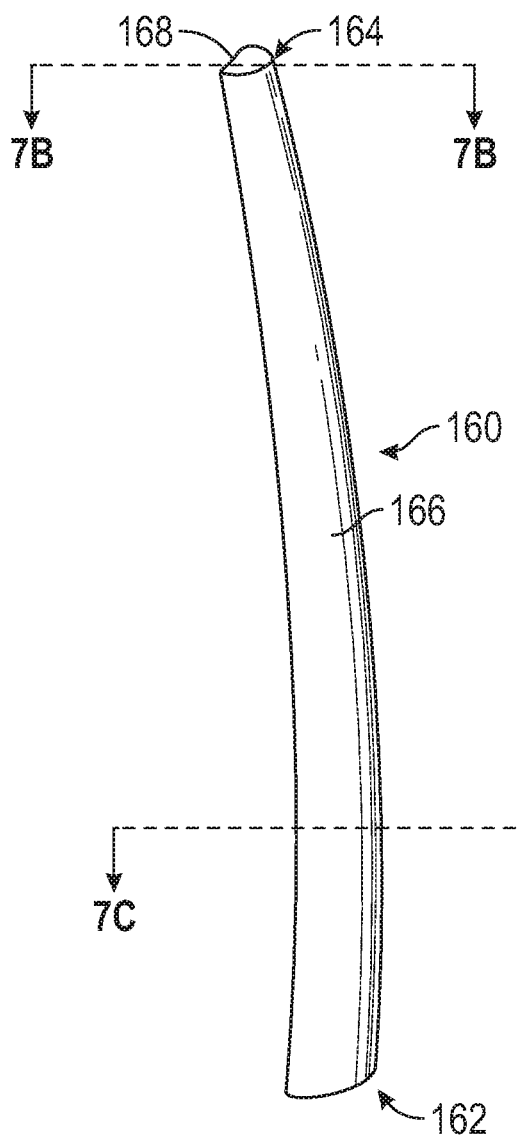
FIG. 7A is an isometric illustration of a leading edge hybrid core body for forming a portion of an airfoil in accordance with an embodiment of the present disclosure.
Figure 7B:
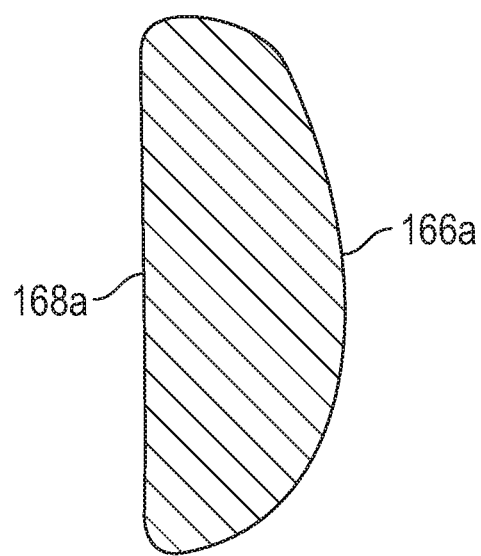
FIG. 7B is a cross-sectional illustration of the leading edge hybrid core body as viewed along the line 7B-7B shown in FIG. 7A.
Figure 7C:
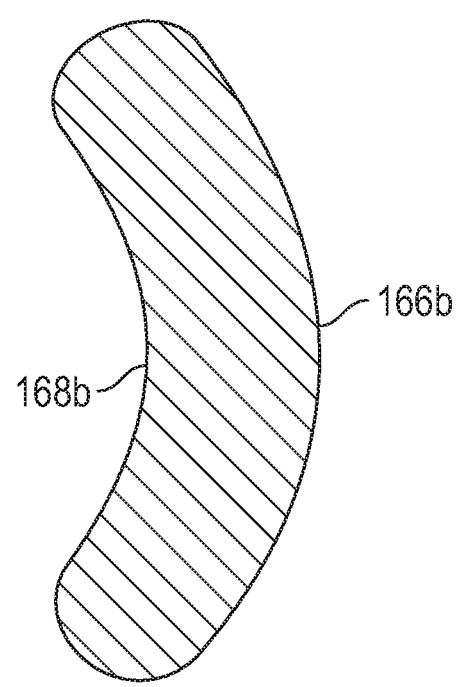
FIG. 7C is a cross-sectional illustration of the leading edge hybrid core body as viewed along the line 7C-7C shown in FIG. 7A.

Turning now to FIGS. 7A-7C, a leading edge hybrid skin core body 160 is shown, the leading edge hybrid skin core body 160 forming, for example, the leading edge hybrid skin core cavity 134 shown in FIGS. 3-6 or variations thereon. The leading edge hybrid skin core body 160 can be used during a manufacturing process to form the leading edge hybrid skin core cavity 134 within an airfoil body 90. In accordance with some embodiments, the manufacturing process used to form an airfoil is an investment casting process, although alternative manufacturing techniques, including additive manufacturing processes, may be utilized to fabricate ceramic silica or alumina core bodies and/or directly additively manufacture airfoil geometries using nickel based powders to produce blade airfoil internal cooling geometries and design configurations in accordance with embodiments of the present disclosure.

The leading edge hybrid skin core body 160 extends from a core first end 162 to a core second end 164. The leading edge hybrid skin core body 160 has a hot wall geometric profile 166 that can follow or mimic an external leading edge profile of the leading edge of an airfoil to be formed. As shown, the geometric shape of the hot wall geometric profile 166 of the leading edge hybrid skin core body 160 can have varying degrees of surface curvature. For example, FIG. 7B illustrates a cross-sectional illustration viewed along the line 7B-7B of FIG. 7A, and illustrates a first hot wall geometric profile 166a and FIG. 7C illustrates a cross-sectional illustration viewed along the line 7C-7C of FIG. 7A, and illustrates a second hot wall geometric profile 166b. As will be readily apparent, the first and second hot wall geometric profiles 166a, 166b of the leading edge hybrid skin core body 160 are different.

A cold wall geometric profile 168 may also vary along the length from the core first end 162 to the core second end 164. For example, as shown in FIGS. 7B-7C, the cold wall geometric profile 168a at the core second end 164 is different from the cold wall geometric profile 168b at a location closer to the core first end 162. The cold wall geometric profile 168, when the leading edge hybrid skin core body 160 is used to form a portion of an airfoil core, defines a cold wall of a leading edge hybrid skin core cavity, such as, as shown in FIGS. 5-6, cold wall 152 that extends along a defining wall of the forward radial flow cavity 138.

As shown in FIGS. 7B-7C, the hot and cold wall geometric profiles 166, 168 can be substantially similar or different at various radial positions along the length of the leading edge hybrid skin core body 160 from the core first end 162 to the core second end 164. In this manner the Reynolds Number, Mach Number, internal convective heat transfer, pressure loss, and coolant temperature heat pick up of the cavity formed from the leading edge hybrid skin core body 160 can be uniquely optimized to balance differences in the local heat flux distribution along a leading edge of an airfoil. In some embodiments, the leading edge hybrid skin core body 160 may include various types of geometric features that generate and promote near wall flow vorticities of the internal cooling air in order to augment local convective heat transfer. Internal convective heat transfer augmentation features may be located within and/or on the leading edge hybrid skin core body 160 to form a leading edge hybrid skin core cavity with various heat transfer augmentation features. The internal convective heat transfer augmentation features can include trip strips, turbulators, pin fins, and/or pedestals to enable an increase in the local leading edge thermal cooling effectiveness.

In accordance with embodiments of the present disclosure, the leading edge hybrid skin core body 160 has a variable height-to-width ratio in a direction from the core first end 162 to the core second end 164, thus forming a first aspect ratio proximate the core first end 162 and a second aspect ratio proximate the core second end 164 in a manufactured airfoil. The first aspect ratio, at the core first end 162, is different from the second aspect ratio, at the core second end 164 (e.g., as shown in FIGS. 7B-7C).

The leading edge hybrid skin core body 160 enables a reduction in local leading edge external wall thickness adjacent to the leading edge 100, as compared to conventional airfoils. The significantly larger aerodynamic leading edge diameter enables the shape, curvature, and contour of the leading edge hybrid skin core cavity 134 to more closely match the adjacent external airfoil geometry at the leading edge 100.

In accordance with embodiments of the present disclosure, the external wall thickness along the leading edge 100 is reduced but the local thermal performance of the leading edge 100 will not be compromised as a result of a puncture or other foreign or domestic object damage. The pressure of the coolant air within the leading edge hybrid skin core cavity 134 is greater than the local external gas path pressure, ensuring that a positive out flow condition will always exist.

The leading edge hybrid skin core cavity 134 is in close proximity to the leading edge 100 and immediately adjacent to high external heat flux location along the stagnation region proximate the leading edge 100 of the airfoil 60. The reduction in local leading edge wall thickness combined with the high internal convective heat transfer achievable with the leading edge hybrid skin core cavity 134 results in a significant increase in the local thermal cooling effectiveness. Consequently the improved heat transfer characteristics of the leading edge design configuration results in cooler operating metal temperatures and increased durability capability at similar and/or reduced cooling flow rates relative to conventional leading edge cooling design configurations.

As will be apparent from FIGS. 7A-7C, the leading edge hybrid skin core body 160 transitions from a first geometry or first aspect ratio at the core first end 162 to a second geometry or second aspect ratio at the core second end 164. This allows for the highest probability of produce-ability while maintaining desired heat transfer characteristics. Such design can reduce the amount of flow required for the airfoil improving the Thrust Specific Fuel Consumption ("TSFC") and or the durability of the airfoil.

Figure 8A:
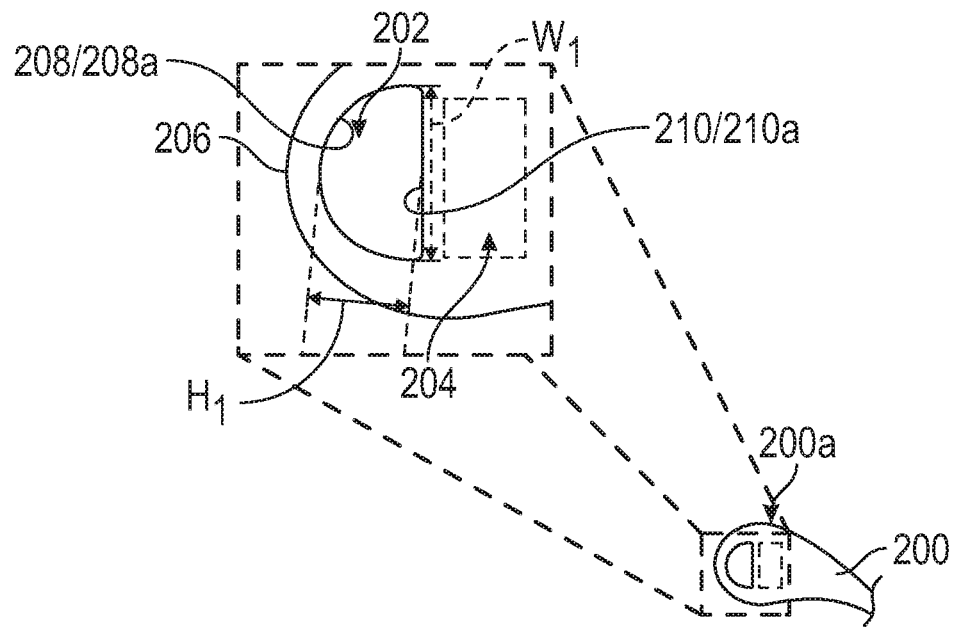
FIG. 8A is a schematic illustration of an airfoil having a leading edge hybrid core cavity in accordance with an embodiment of the present disclosure, illustrating an internal structure proximate a tip of the airfoil.
Figure 8B:
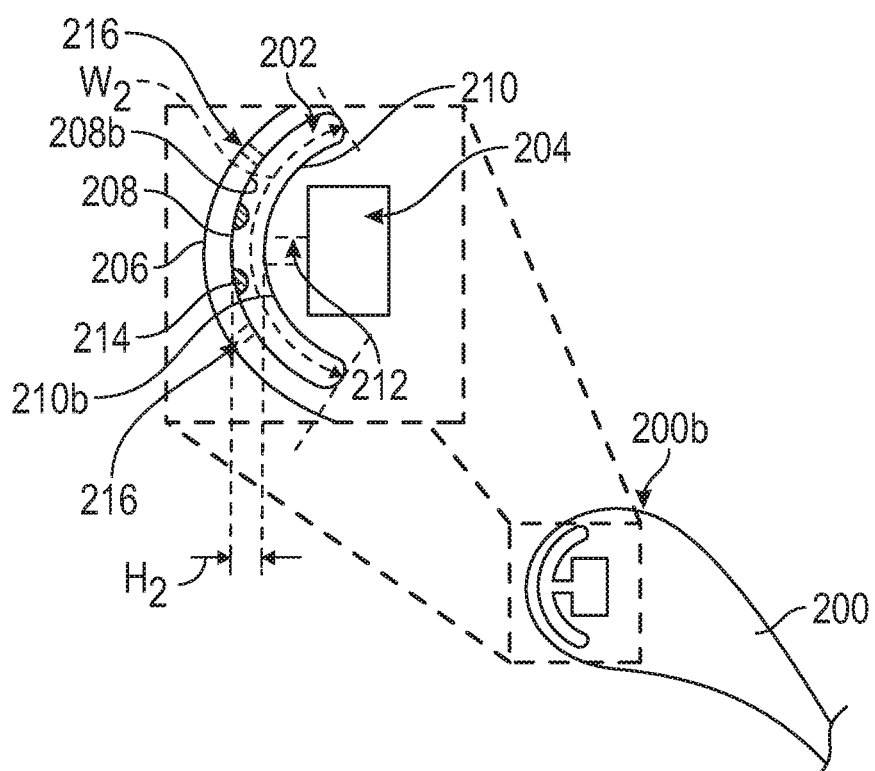
FIG. 8B is a schematic illustration of the airfoil of FIG. 8A illustrating an internal structure proximate a root of the airfoil.

Turning now to FIGS. 8A-8B, schematic illustrations of an airfoil 200 formed in accordance with an embodiment of the present disclosure is shown. The airfoil 200 includes a leading edge hybrid skin core cavity 202 that extends from a root 200b to a tip 200a of the airfoil 200, as shown and described above. The leading edge hybrid skin core cavity 202 can be formed using a leading edge hybrid skin core, as described above. FIG. 8A illustrates a cross-sectional illustration of the airfoil 200 proximate the tip 200a of the airfoil 200 and FIG. 8B illustrates a cross-sectional illustration of the airfoil 200 proximate the root 200b of the airfoil 200. As shown in FIGS. 8A-8B, a radial flow cavity 204 can extend at least partially through the airfoil 200 adjacent the leading edge hybrid skin core cavity 202. Those of skill in the art will appreciate that the airfoil 200 is merely a schematic illustration and airfoils in accordance with embodiments of the present disclosure can include more and/or different geometry cavities, such as those shown and described above.

The leading edge hybrid skin core cavity 202 is located proximate a leading edge 206 of the airfoil 200, with the leading edge 206 being a hot surface of the airfoil 200 when in operation. The leading edge hybrid skin core cavity 202 includes a hot wall 208 that is a surface of the leading edge hybrid skin core cavity 202 that runs along the hot surface of the leading edge 206. The hot wall 208 is a defining surface of the leading edge hybrid skin core cavity 202 that has direct thermal exchange with a hot exterior surface of the airfoil 200. Further, the leading edge hybrid skin core cavity 202 includes a cold wall 210 that defines an airfoil-interior surface of the leading edge hybrid skin core cavity 202. The cold wall 210 does not have direct thermal exchange with a hot exterior surface of the airfoil 200.

The hot wall 208 has a first hot wall geometric profile 208a that is proximate the tip 200a of the airfoil 200 and the cold wall 210 has a first cold wall geometric profile 210a that is proximate the tip 200a of the airfoil 200. Similarly, a second hot wall geometric profile 208b and a second cold wall geometric profile 210b are proximate a root 200b of the airfoil 200. As noted above, and shown in FIGS. 8A-8B, the leading edge hybrid skin core cavity 202 has different geometric profiles at the root 200b (FIG. 8B) and tip 200a (FIG. 8A).

The geometry of the profile of the leading edge hybrid skin core cavity 202 can be defined as a relationship between a height and a width of the cavity, as defined by the hot and cold walls. An aspect ratio of the leading edge hybrid skin core cavity 202 is defined as the height-to-width ratio at any given radial position (e.g., along the extent of the cavity from root to tip). As defined herein, the "height" of the leading edge hybrid skin core cavity 202 at a given radial position (e.g., from root to tip) is the maximum distance between the hot wall 208 and the cold wall 210. For the same radial position the "width" is the arc length of the cold wall 210. Thus, as shown in FIG. 8A, at the tip 200a of the airfoil 200, the leading edge hybrid skin core cavity 202 has a first height $H_1$ and a first width $W_1$. Similarly, as shown in FIG. 8B, proximate the root 200b of the airfoil 200, the leading edge hybrid skin core cavity 202 has a second height $H_2$ and a second width $W_2$.

In accordance with embodiments of the present disclosure, the leading edge hybrid skin core cavity 202 will transition from a low aspect ratio proximate to the root 200b of the airfoil 200 to a high aspect ratio proximate the tip 200a of the airfoil 200. The transition from the root to tip can be gradual, smooth, or stepped, depending on desired airflow characteristics, internal features, etc. As shown in FIGS. 8A-8B, the radial flow cavity 204 is fluidly connected to the leading edge hybrid skin core cavity 202 by optional impingement cooling holes 212.

As shown in FIG. 8B, the leading edge hybrid skin core cavity 202 includes optional heat transfer augmentation features 214. The optional heat transfer augmentation features 214 can be, but are not limited to, trip strips, turbulators, pedestals, pin fins, or the like. Further, as schematically shown, the leading edge 206 includes optional showerhead film cooling holes 216, as will be appreciated by those of skill in the art.

Figure 9A:
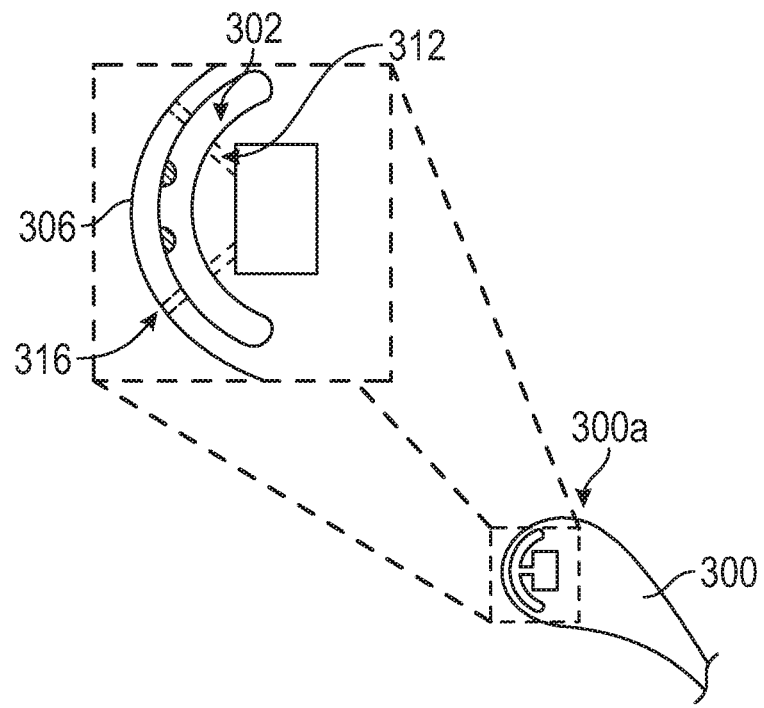
FIG. 9A is a schematic illustration of an airfoil having a leading edge hybrid core cavity in accordance with another embodiment of the present disclosure, illustrating an internal structure proximate a tip of the airfoil.
Figure 9B:
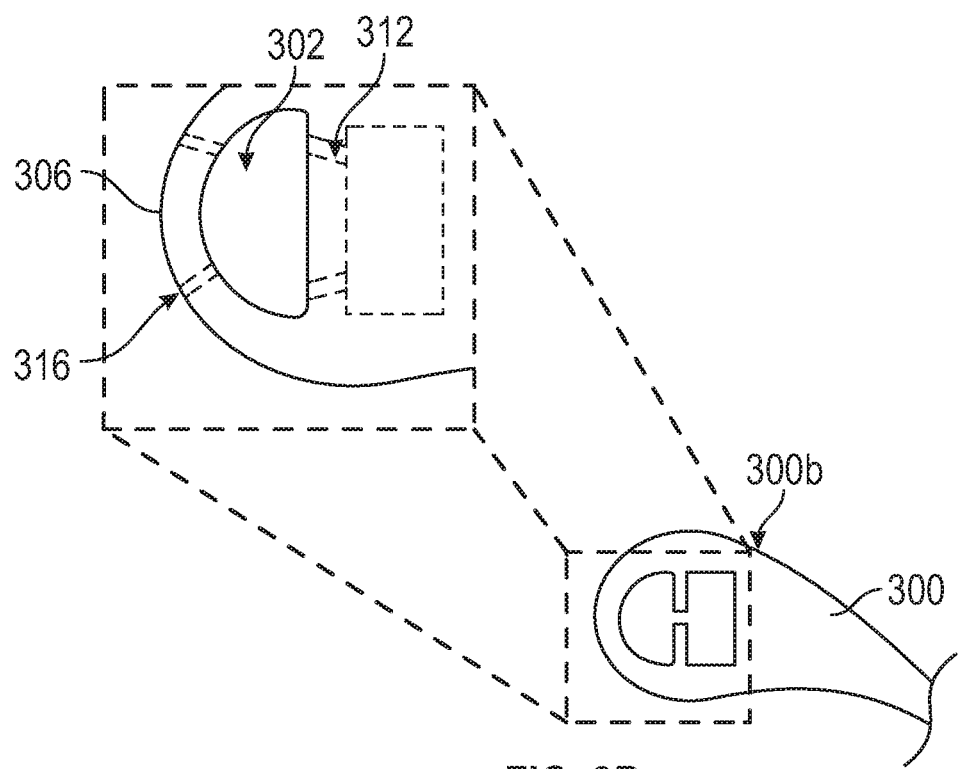
FIG. 9B is a schematic illustration of the airfoil of FIG. 9A illustrating an internal structure proximate a root of the airfoil.

Turning now to FIGS. 9A-9B, depending on the radial freestream gas temperature distribution, leading edge heat flux, and leading edge showerhead film cooling pressure ratio requirements, it may be desirable to transition the leading edge hybrid skin core cavity from a high aspect ratio proximate the root of the airfoil to a low aspect ratio proximate the tip of the airfoil. For example, FIGS. 9A-9B illustrates an airfoil 300 having a substantially opposite configuration of a leading edge hybrid skin core cavity 302 as compared to that shown in FIGS. 8A-8B. FIG. 9A illustrates the airfoil 300 at a tip 300a thereof, with a high aspect ratio portion of the leading edge hybrid skin core cavity 302 formed therein. FIG. 9B illustrates the airfoil 300 at a root 300b thereof, with a low aspect ratio portion of the leading edge hybrid skin core cavity 302 formed therein.

In this instance, it may be advantageous to increase the internal convective surface area and aspect ratio of the leading edge hybrid skin core cavity 302 at the root 300b where the internal coolant temperature is generally cooler due the proximate location to an inlet supply feed location. The higher aspect ratio at the root 300b will also enable increased driving pressure for leading edge showerhead film cooling holes proximate the root 300b of the airfoil 300. While at the tip 300a of the airfoil 300 a low aspect ratio portion of the leading edge hybrid skin core cavity 302 may be more desirable because airfoil geometry is generally smaller in cross section due to aerodynamic loading and structural requirements. The low aspect ratio portion of the leading edge hybrid skin core cavity 302 creates a reduced backside impingement length due to the proximity of the leading edge impingement holes to a leading edge external airfoil hot wall 306. The low aspect ratio geometry of the leading edge hybrid skin core cavity 302 at the tip 300a of the airfoil 300 enables the backside impingement heat transfer and leading edge showerhead film hole heat transfer entrance effects to be maximized thereby increasing the local leading edge airfoil tip thermal convective cooling effectiveness and durability capability.

As shown in FIGS. 9A-9B, optional impingement cooling holes 312 and optional showerhead film cooling holes 316 are provided at both the tip 300a and the root 300b of the airfoil 300. However, in some embodiments, the impingement cooling holes 312 and/or the showerhead film cooling holes 316 may be omitted entirely or along a portion of the airfoil 300 between the root 300b and the tip 300a. That is, the arrangements of FIGS. 8A-8B, 9A-9B are provided for illustrative purposes only and various other configurations are possible without departing from the scope of the present disclosure. In one non-limiting example, the radial flow cavity that is schematically shown in FIGS. 8A-8B, 9A-9B may be fluidly separate or isolated from the leading edge hybrid skin core cavity (e.g., no impingement cooling holes). Also, as is apparent from the illustration of FIG. 8A, in this embodiment the tip 300a does not include showerhead film cooling holes or impingement cooling holes, whereas the root 300b of the airfoil 300 includes both types of cooling. The arrangement (location, number, position, angle, size, etc.) of cooling holes, both with respect to the exterior (e.g., showerhead film cooling holes) and the interior (e.g., impingement cooling holes) can be predefined based on cooling requirements, structural considerations, airflow control dynamics, or other considerations, as will be appreciated by those of skill in the art.

Although shown with the leading edge hybrid skin core cavity of various embodiments appearing substantially symmetric about and/or relative to a leading edge surface of an airfoil, such arrangement is not to be limiting. For example, in some embodiments, the leading edge hybrid skin core cavity may be non-symmetric and/or biased in position toward one of the pressure side or suction side of the airfoil.

In some embodiments, the aspect ratio of the leading edge hybrid skin core cavity proximate the root of the airfoil may be between 0.2 and 0.45. Further, the aspect ratio of the leading edge hybrid skin core cavity proximate the tip of the airfoil may be 0.7 or greater. As the leading edge hybrid skin core cavity extends along the length of the airfoil from root to tip, the aspect ratio can transition from the low aspect ratio of the root to the high aspect ratio of the tip. Thus, the geometric profile of the leading edge hybrid skin core cavity changes from the root to the tip of the airfoil. Such leading edge hybrid skin core cavity can be formed from a leading edge hybrid skin core, e.g., as shown in FIGS. 7A-7C.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a leading edge, a trailing edge, a first end, and a second end, wherein a direction from the first end to the second end is a radial direction and a direction from the leading edge to the trailing edge is an axial direction, wherein an airfoil-tip squealer pocket is formed in the second end of the airfoil body;
    a leading edge hybrid skin core cavity formed within the airfoil body and defining a cooling flow path extending from the first end to the second end of the airfoil proximate the leading edge of the airfoil, the leading edge hybrid skin core cavity having a hot wall and a cold wall, the hot wall being a cavity wall that is part of an external wall of the leading edge of the airfoil body and the cold wall is an internal wall or surface of the airfoil body that is not adjacent or part of an external wall of the airfoil body;
    wherein the leading edge hybrid skin core cavity has a variable height-to-width ratio in a direction from the first end to the second end, with a first aspect ratio proximate the first end and a second aspect ratio proximate the second end, wherein the first aspect ratio is different from the second aspect ratio, and
    wherein the height is defined as a maximum distance between the hot wall and the cold wall and the width is defined as an arc length of the cold wall,
    wherein the leading edge hybrid skin core cavity opens from an interior of the airfoil body at the second end to enable discharge of cooling air into the airfoil-tip squealer pocket,
    wherein the hot wall has a first hot wall geometric profile proximate the second end, wherein the first hot wall geometric profile is arcuate, and a second hot wall geometric profile proximate the first end, wherein the second hot wall geometric profile is arcuate, and wherein first hot wall geometric profile is different from the second hot wall geometric profile,
    wherein the cold wall has a first cold wall geometric profile proximate the second end, wherein the first cold wall geometric profile is arcuate, and a second cold wall geometric profile proximate the first end, wherein the second cold wall geometric profile is straight, and
    wherein the geometric profile of the hot wall and the geometric profile of the cold wall each transitions smoothly between the first end and the second end; and
    wherein the first cold wall geometric profile mimics the first hot wall geometric profile.

2. The airfoil of claim 1, wherein the first aspect ratio is less than 0.5 and the second aspect ratio is greater than 0.6.

3. The airfoil of claim 1, further comprising a radial flow cavity located within the airfoil body axially behind the leading edge hybrid skin core cavity relative to the leading edge of the airfoil body.

4. The airfoil of claim 3, wherein the cold wall is located between the radial flow cavity and the leading edge hybrid skin core cavity.

5. The airfoil of claim 4, further comprising at least one impingement hole formed in the cold wall and fluidly connecting the radial flow cavity and the leading edge hybrid skin core cavity.

6. The airfoil of claim 1, wherein the hot wall has a hot wall geometric profile that mimics an external leading edge profile of the leading edge of the airfoil.

7. The airfoil of claim 1, further comprising at least one internal convective heat transfer augmentation feature within the leading edge hybrid skin core cavity.

8. The airfoil of claim 7, wherein the internal convective heat transfer augmentation feature is at least one of trip strips, turbulators, pin fins, or pedestals.

9. The airfoil of claim 1, wherein the first end is a root of the airfoil and the second end is a tip of the airfoil.

10. A leading edge hybrid core for manufacturing an airfoil of a gas turbine engine, the core comprising:
    a core body that extends from a core first end to a core second end, the core body having a hot wall geometric profile extending from the core first end to the core second end and a cold wall geometric profile extending from the core first end to the core second end, the core body defining a structure to form a cavity in a formed airfoil;
    wherein core body has a variable height-to-width ratio in a direction from the core first end to the core second end, with a first aspect ratio proximate the core first end and a second aspect ratio proximate the core second end wherein the first aspect ratio is different from the second aspect ratio, and
    wherein the height is defined as maximum distance between the hot wall geometric profile and the cold wall geometric profile and the width is defined as an arc length of the cold wall geometric profile,
    the core body defining a region to form an opening in the formed airfoil to enable air from an interior of the airfoil body at the core second end to discharge cooling air into a formed airfoil-tip squealer pocket in a tip of the formed airfoil,
    wherein the hot wall geometric profile transitions from a first hot wall geometric profile proximate the core second end to a second hot wall geometric profile proximate the core first end, wherein the first hot wall geometric profile is arcuate and the second hot wall geometric profile is arcuate, and wherein the first hot wall geometric profile is different from the second hot wall geometric profile, wherein the cold wall geometric profile transitions from a first cold wall geometric profile proximate the core second end to a second cold wall geometric profile proximate the core first end, wherein the first cold wall geometric profile is arcuate and the second hot wall geometric profile is straight different from the second cold wall geometric profile, and wherein the geometric profile of the hot wall and the geometric profile of the cold wall each transitions smoothly between the core first end and the core second end; and wherein the first cold wall geometric profile mimics the first hot wall geometric profile.

11. The leading edge hybrid core of claim 10, wherein the first aspect ratio is less than 0.5 and the second aspect ratio is greater than 0.6.

12. The leading edge hybrid core of claim 10, wherein the hot wall geometric profile is arranged to mimic an external leading edge profile of a leading edge of an airfoil to be formed by the leading edge hybrid core.

13. The leading edge hybrid core of claim 10, further comprising at least one structure to form an internal convective heat transfer augmentation feature within a leading edge hybrid skin core cavity formed by the leading edge hybrid core.

14. The leading edge hybrid core of claim 13, wherein the internal convective heat transfer augmentation feature is at least one of trip strips, turbulators, pin fins, or pedestals.

* * * * *